United States Patent
Tomoda et al.

(10) Patent No.: US 12,248,543 B2
(45) Date of Patent: Mar. 11, 2025

(54) FRAUD DETECTION SYSTEM, FRAUD DETECTION METHOD, AND PROGRAM

(71) Applicant: RAKUTEN GROUP, INC., Tokyo (JP)

(72) Inventors: Kyosuke Tomoda, Tokyo (JP); Takahiro Kuriki, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 17/909,984

(22) PCT Filed: Jun. 29, 2021

(86) PCT No.: PCT/JP2021/024566
§ 371 (c)(1),
(2) Date: Sep. 7, 2022

(87) PCT Pub. No.: WO2023/275995
PCT Pub. Date: Jan. 5, 2023

(65) Prior Publication Data
US 2024/0202293 A1    Jun. 20, 2024

(51) Int. Cl.
*G06F 21/31* (2013.01)
(52) U.S. Cl.
CPC .................................. *G06F 21/31* (2013.01)
(58) Field of Classification Search
CPC ........ G06F 21/31; G06F 21/316; G06F 21/45; G06F 21/554; G06Q 30/0185
See application file for complete search history.

(56) References Cited

U.S. PATENT DOCUMENTS

| | | | |
|---|---|---|---|
| 9,379,896 B1 * | 6/2016 | Altman | G06F 21/31 |
| 2008/0162202 A1 * | 7/2008 | Khanna | G06Q 30/06 |
| | | | 705/14.47 |
| 2011/0295672 A1 * | 12/2011 | Dimitriadis | G06Q 40/12 |
| | | | 707/769 |
| 2017/0357971 A1 * | 12/2017 | Pitz | H04W 4/021 |
| 2019/0259037 A1 | 8/2019 | Kimura | |

(Continued)

FOREIGN PATENT DOCUMENTS

| | | |
|---|---|---|
| CN | 101689988 A | 3/2010 |
| JP | 2002258972 A | 9/2002 |

(Continued)

OTHER PUBLICATIONS

Search Report of Jan. 10, 2023, for corresponding EP Patent Application No. 21925099.0, pp. 1-8 .

(Continued)

*Primary Examiner* — Gil H. Lee
(74) *Attorney, Agent, or Firm* — HEA Law PLLC

(57) ABSTRACT

At least one processor of a fraud detection system detects a login of a user in a predetermined service. The least one processor displays a user information screen for changing or registering user information on a display for the user who has logged in to the service. The least one processor acquires action information relating to an action of the user in at least a part of a period from detection of the login to display of the user information screen. The least one processor detects fraud by the user based on the action information.

19 Claims, 12 Drawing Sheets

(56) References Cited

U.S. PATENT DOCUMENTS

2021/0049259 A1   2/2021   Cheng et al.

FOREIGN PATENT DOCUMENTS

JP    2010515175 A    5/2010
WO    2018087839 A1   5/2018

OTHER PUBLICATIONS

Office Action of Jun. 26, 2023, for corresponding TW Patent Application No. 111124226, pp. 1-9. (For concise explanation of relevance, see the relevance code on p. 9).
International Search Report of Sep. 28, 2021, relating International Patent Application for PCT/JP2021/024566, pp. 1-10.

* cited by examiner

FIG.8

| | INPUT | | | | | | OUTPUT |
|---|---|---|---|---|---|---|---|
| TIME INFORMATION | SCREEN COUNT INFORMATION | OPERATION AMOUNT INFORMATION | SCREEN TYPE INFORMATION | LOCATION INFORMATION | DATE AND TIME INFORMATION | ... | |
| 81 SECONDS | 15 SCREENS | 160 | TYPE 10 | LOCATION 10 | 2021/2/10 13:22:43 | ... | VALID |
| 2 SECONDS | 1 SCREEN | 3 | TYPE 11 | LOCATION 11 | 2021/2/10 14:16:02 | ... | FRAUD |
| 4 SECONDS | 2 SCREENS | 8 | TYPE 12 | LOCATION 12 | 2021/2/10 15:08:25 | ... | FRAUD |
| ... | ... | ... | ... | ... | ... | ... | ... |

DB2

FRAUD DETECTION SYSTEM, FRAUD DETECTION METHOD, AND PROGRAM

CROSS REFERENCE TO RELATED APPLICATIONS

This application is a National Stage of International Application No. PCT/JP2021/024566 filed on Jun. 29, 2021. The contents of the above document is incorporated herein by reference in its entirety.

TECHNICAL FIELD

The present disclosure relates to a fraud detection system, a fraud detection method, and a program.

BACKGROUND ART

Hitherto, there has been known a technology for detecting fraud by a user who has logged in to a predetermined service based on an action of the user. For example, in Patent Literature 1, there is described an information processing device which calculates a fraud determination score based on a plurality of items for each predetermined operation performed by a user. It is described that, when the user performs an operation to change user information immediately after a login operation, the information processing device calculates the fraud determination score of the operation to change the user information performed immediately after the login based on the fraud determination score of the login operation immediately before the operation to change the user information.

CITATION LIST

Patent Literature

[PTL 1] WO 2018/087839 A1

SUMMARY OF INVENTION

Technical Problem

A fraudulent user may fraudulently log in for the purpose of changing or registering user information. In some cases, characteristic actions performed by a fraudulent user are different from those of a valid user in a period from login until change or registration of the user information. Thus, it is important to consider a series of actions performed during this period comprehensively. However, with the technology as described in Patent Literature 1, the fraud determination score is calculated for each operation, and the series of actions is not considered comprehensively. As a result, an accuracy of fraud detection is not sufficiently enhanced.

An object of the present disclosure is to enhance an accuracy of fraud detection.

Solution to Problem

According to one aspect of the present disclosure, there is provided fraud detection system including: login detection means for detecting a login of a user in a predetermined service; display control means for displaying a user information screen for changing or registering user information on display means for the user who has logged in to the predetermined service; action information acquisition means for acquiring action information relating to an action of the user in at least a part of a period from detection of the login to display of the user information screen; and fraud detection means for detecting fraud by the user based on the action information.

Advantageous Effects of Invention

According to the present disclosure, the accuracy of fraud detection is enhanced.

BRIEF DESCRIPTION OF DRAWINGS

FIG. 8 is a table for showing a data storage example of a training database.

DESCRIPTION OF EMBODIMENTS

1. Overall Configuration of Fraud Detection System

Figure 1:
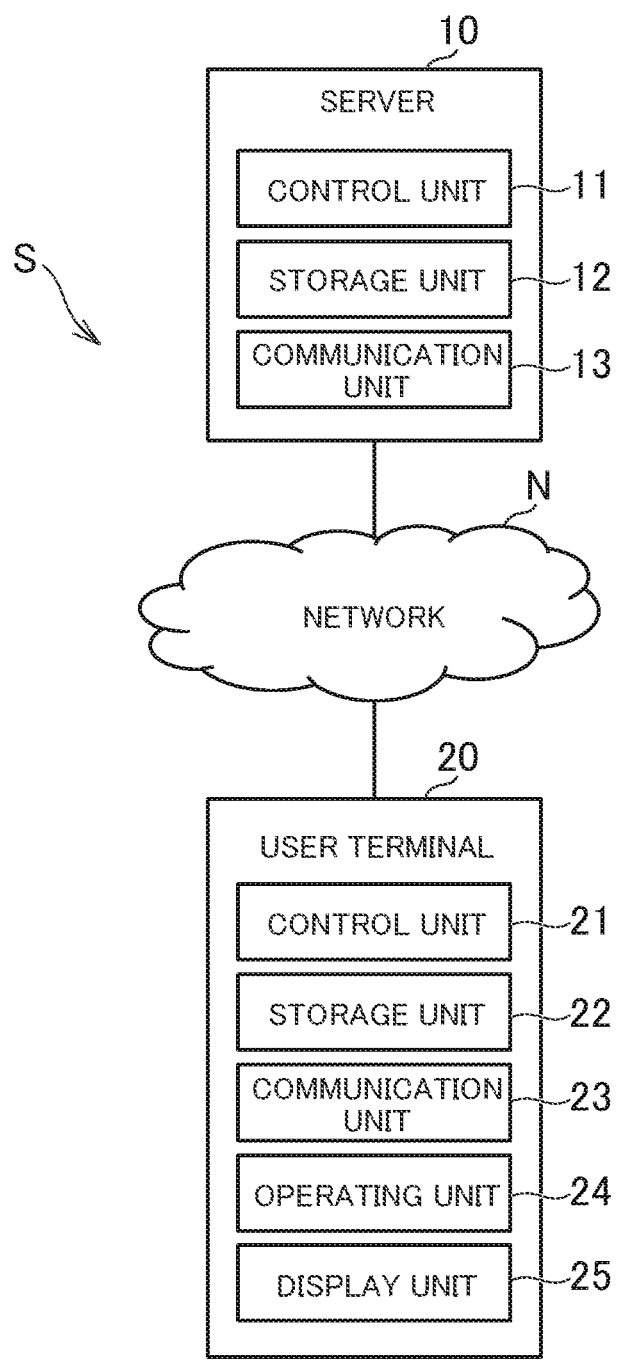
FIG. 1 is a diagram for illustrating an example of an overall configuration of a fraud detection system.

Now, an example of an embodiment of a fraud detection system according to the present disclosure is described. FIG. 1 is a diagram for illustrating an example of an overall configuration of the fraud detection system. As illustrated in FIG. 1, a fraud detection system S includes a server 10 and a user terminal 20. Each of the server 10 and the user terminal 20 can be connected to a network N such as the Internet. It is sufficient that the fraud detection system S includes at least one computer, and is not limited to the example of FIG. 1. For example, the fraud detection system S may include a plurality of servers 10. The fraud detection system S may include a plurality of user terminals 20. The fraud detection system S may include another computer.

The server 10 is a server computer. The server 10 includes a control unit 11, a storage unit 12, and a communication unit 13. The control unit 11 includes at least one processor. The storage unit 12 includes a volatile memory such as a RAM, and a nonvolatile memory such as a hard disk drive. The communication unit 13 includes at least one of a communication interface for wired communication or a communication interface for wireless communication.

The user terminal 20 is a computer to be operated by a user. For example, the user terminal 20 is a personal computer, a smartphone, a tablet computer, or a wearable terminal. The user terminal 20 includes a control unit 21, a storage unit 22, a communication unit 23, an operating unit 24, and a display unit 25. Physical configurations of the control unit 21, the storage unit 22, and the communication unit 23 are the same as those of the control unit 11, the storage unit 12, and the communication unit 13, respectively. The operating unit 24 is an input device such as a touch panel. The display unit 25 is a liquid crystal display or an organic EL display.

At least one of programs or data stored in each of the server 10 and the user terminal 20 may be supplied thereto via the network N. Further, each of the server 10 and the user terminal 20 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

2. Outline of Fraud Detection System

The fraud detection system S detects fraud by a user who has logged in to a predetermined service. As used herein, "fraud" refers to an illegal act, an act that violates terms of use of the service, or some other act causing a nuisance. In this embodiment, a case in which the act of logging in to a service with the user ID and password of another user and changing or registering user information corresponds to fraud is taken as an example. Accordingly, such an act as used in this embodiment can be read as "fraud." The fraud detection system S can detect various types of fraud. Examples of other types of fraud are described in modification examples described later.

To detect fraud is to estimate or determine presence or absence of fraud. For example, outputting information indicating whether or not there is fraud, or outputting a score indicating a level of suspicion of fraud corresponds to detecting fraud. For example, when the score is represented numerically, a higher score indicates a higher suspicion of fraud. In addition to numbers, the score may be expressed by characters, for example, "S rank," "A rank," and "B rank." The score can also be a probability or a likelihood of fraud.

The user information is information relating to the user. The user information is information registered in association with the user ID. In this embodiment, a case in which the user information includes authentication information to be used in authentication is taken as an example. The authentication is not limited to the authentication at a login, and may be authentication executed after the login. Various known authentication methods can be used for the authentication itself. For example, the authentication may be password authentication, passcode authentication, personal identification number authentication, telephone number authentication, countersign authentication, pattern authentication, or biometric authentication. The user information may include any information. For example, the user information may include personal information such as an address, a telephone number, a date of birth, or an electronic mail address. It is sufficient that the user information includes at least one of those pieces of information.

In this embodiment, a social networking service (SNS) is described as an example of the predetermined service. Accordingly, "SNS" as used in this embodiment can be read as "predetermined service." The fraud detection system S can be applied to any service. Examples in which the fraud detection system S is applied to other services are described in the modification examples described later. In this embodiment, the act of logging in to the SNS with the user ID and password of another person and changing or registering the authentication information corresponds to fraud.

Figure 2:
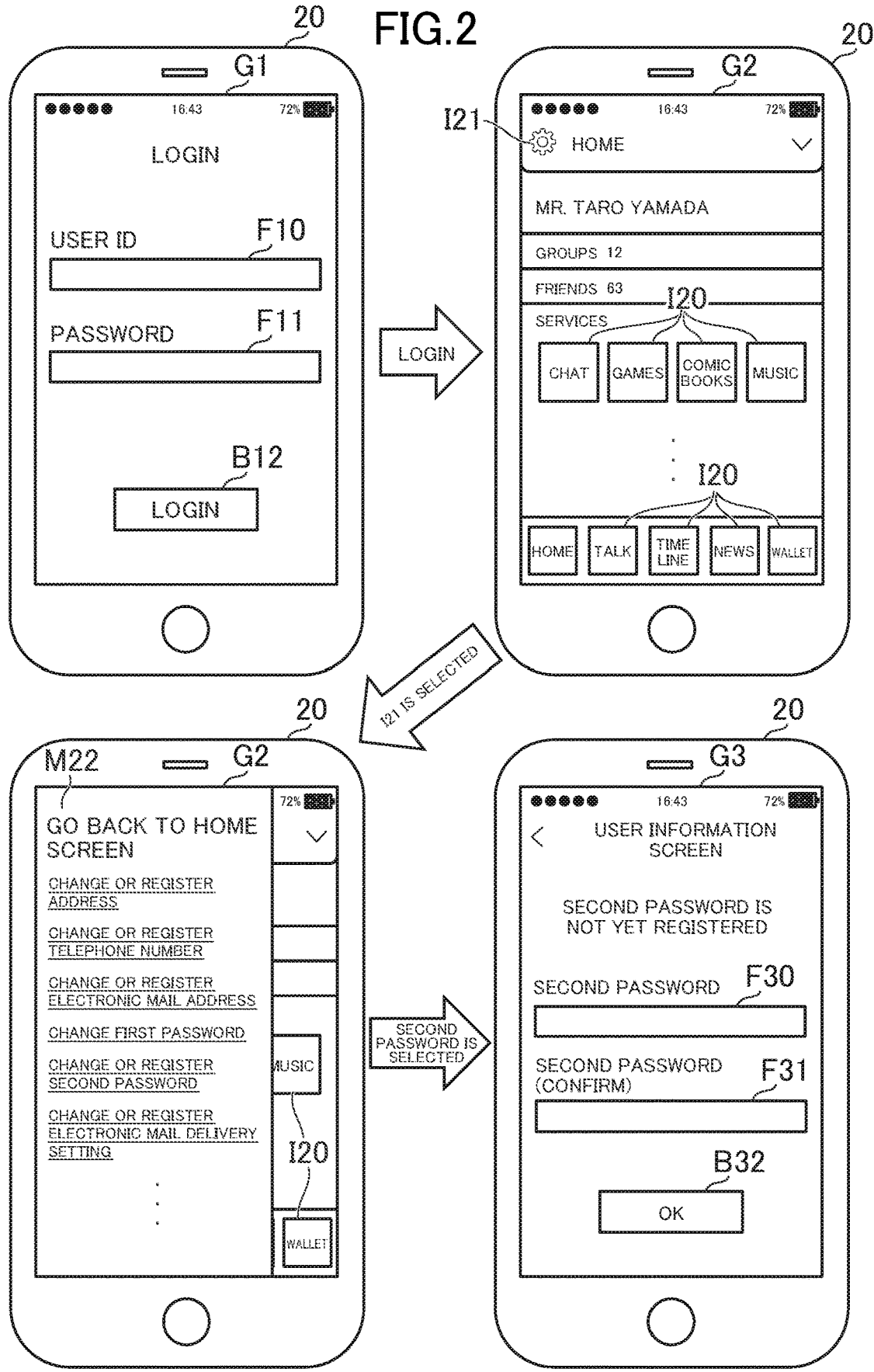
FIG. 2 is a diagram for illustrating an example of screen transitions at the time when a user logs in to an SNS.

FIG. 2 is a diagram for illustrating an example of screen transitions at the time when the user logs in to the SNS. As illustrated in FIG. 2, when the user starts an SNS application installed on the user terminal 20 or accesses an SNS website by using a browser of the user terminal 20, a login screen G1 for logging in to the SNS is displayed on the display unit 25. In this embodiment, it is assumed that the user has completed registration to use the SNS and a user ID and a password have been issued.

The user inputs the user ID and password in input forms F10 and F11, and selects a button B12. The server 10 executes authentication based on the user ID and password input by the user. When the authentication is successful, a login to the SNS is permitted, and a home screen G2 is displayed on the display unit 25. The user can use various services provided by the SNS from the home screen G2.

The SNS in this embodiment provides not only a place for interactions between users but also various services in an all-encompassing manner. For example, the user can use content, such as a game, an electronic book, music, or a news article, from the home screen G2. Further, for example, the user can purchase such content by using payment means registered for the SNS. When the user selects an icon I20, the service corresponding to the icon I20 is provided.

The user can also perform settings in the SNS from the home screen G2. For example, the user can perform various settings, such as a profile setting, a notification setting, a message display setting, a friend display setting, or a usage setting of individual services. In this embodiment, changing or registering the user information is taken as an example of the setting. Changing the user information means changing the content of all or a part of the registered user information. "Changing the user information" can also be referred to as "updating the user information." Deleting all or a part of the user information also corresponds to changing the user information. Registering the user information means newly adding all or a part of the user information.

For example, when the user selects an icon I21 on the home screen G2, a menu M22 showing a list of the setting items is displayed. In the menu M22, setting items for changing or registering the user information are displayed. When the user selects a setting item in the menu M22, the user information corresponding to the selected setting item can be changed or registered. For example, the user can change or register an address, a telephone number, an electronic mail address, a password, or an electronic mail delivery setting.

In this embodiment, it is possible to register a password different from the password input in the input form F11. The password input in the input form F11 is hereinafter referred to as "first password." A password different from the first password is referred to as "second password." Registration of the first password is mandatory. Thus, in the menu M22, "change first password" is displayed, but the word "register" is not displayed.

In this embodiment, registration of the second password is optional. Even a case in which the input of the user ID and the first password is omitted by using cookies or the like, when the user has already registered the second password, input of the second password is required. For example, when "change or register second password" of the menu M22 is selected, a user information screen G3 for changing or registering the second password is displayed. When the user inputs the second password in input forms F30 and F31 and selects a button B32, the change or registration of the second password is complete. When the second password is to be changed, input of the old second password may be required.

For example, in a case in which a user who has not performed fraud in the past (hereinafter referred to as "valid user") has not registered the second password, a user who fraudulently obtains the user ID and first password of the valid user by phishing or the like (hereinafter referred to as "fraudulent user") may impersonate the valid user to log in to the SNS. Further, the fraudulent user may register the second password to prevent the valid user from logging in. Such a fraudulent user logs in to the SNS for the purpose of registering the second password, and therefore a series of actions after the login is often different from that of valid users.

Figure 3:
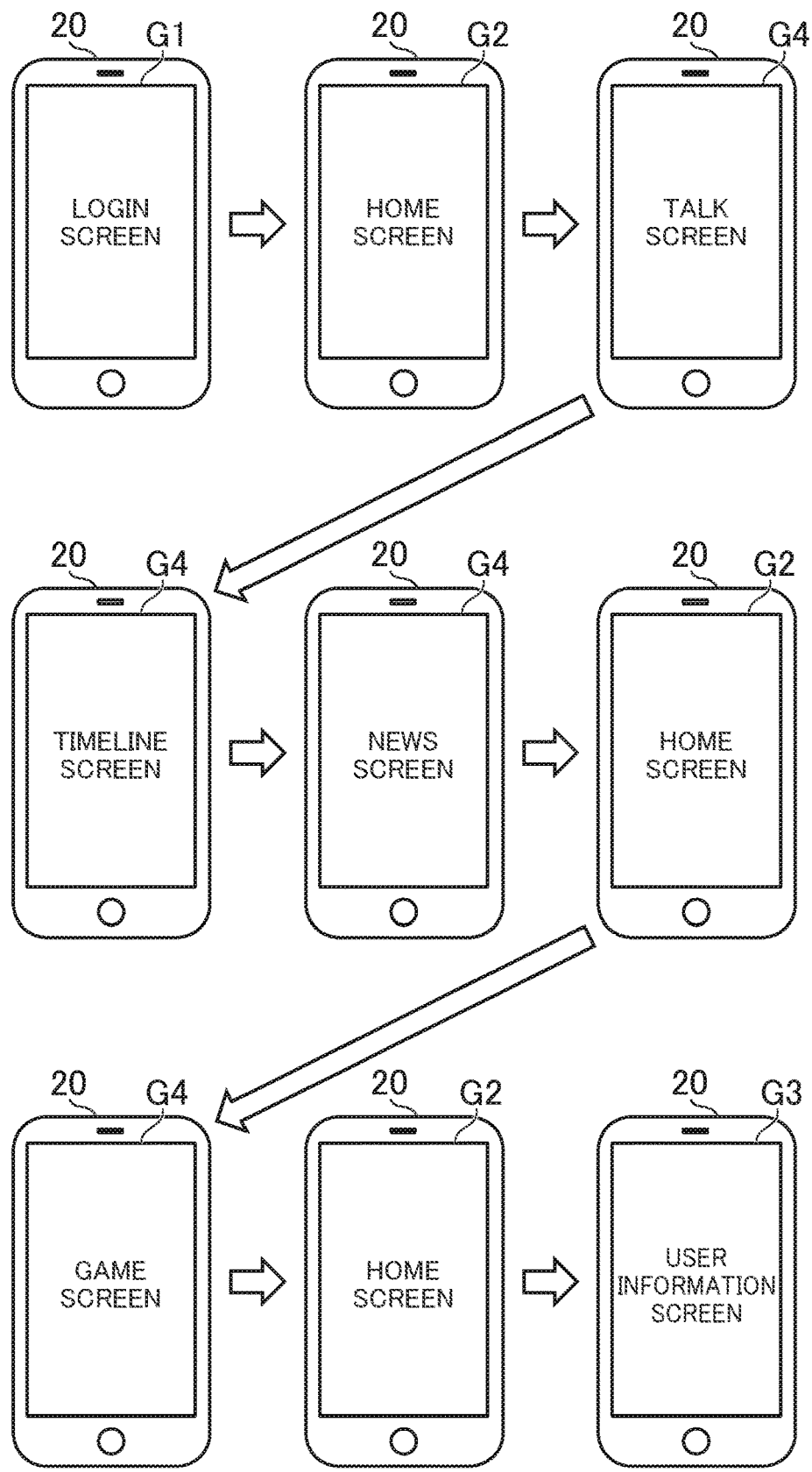
FIG. 3 is a diagram for illustrating an example of screen transitions at the time when a valid user logs in to the SNS.

FIG. 3 is a diagram for illustrating an example of screen transitions at the time when a valid user logs in to the SNS. In FIG. 3, only types of the screens are shown, and details of each screen are omitted. This point is the same in FIG. 4, which is described later. Valid users often log in to the SNS for the purpose of interacting with friends and browsing content. Thus, after the screen has transitioned from the login screen G1 to the home screen G2, screens G4 other than the user information screen G3 are often displayed. Valid users often change or register the user information as a part of performing something else, and therefore the other screens are often displayed by the time the user information screen G3 is reached, as illustrated in FIG. 3.

Figure 4:
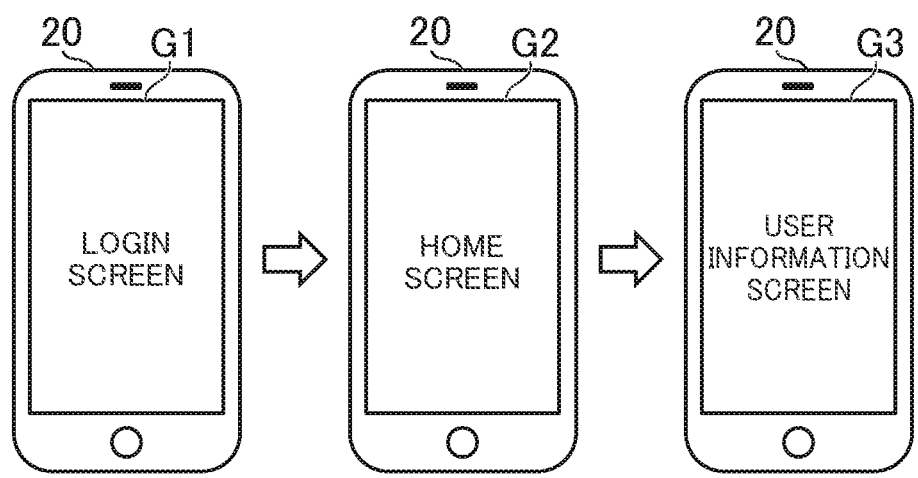
FIG. 4 is a diagram for illustrating an example of screen transitions at the time when a fraudulent user logs in to the SNS.

FIG. 4 is a diagram for illustrating an example of screen transitions at the time when a fraudulent user logs in to the SNS. Fraudulent users often log in to the SNS for the purpose of changing or registering user information such as the second password. Thus, after the screen has transitioned from the login screen G1 to the home screen G2, the user information screen G3 is often displayed without the display of the other screens G4. Unlike a valid user, a fraudulent user is unlikely to change or register user information as a part of performing something else, and therefore as illustrated in FIG. 4, a fraudulent user often goes to the user information screen G3 immediately after the home screen G2.

In view of the above, the fraud detection system S detects fraud by a certain user based on the series of actions performed from when the user logs in to the SNS until the user information screen G3 is displayed. In this embodiment, a case in which fraud is detected by using a machine-learning-based learning model is taken as an example, but fraud may be detected without using a learning model. For example, a rule-based fraud detection model that is not referred to as a learning model may be used. Moreover, for example, other methods that are not particularly referred to as a model may be used.

The learning model is a model which uses machine learning. Machine learning is sometimes called "artificial intelligence." As the machine learning itself, it is possible to use various known methods, and it is possible to use, for example, a neural network. In a broad sense, deep learning and reinforcement learning are also classified as machine learning, and hence the learning model may be a model created by using deep learning or reinforcement learning. In this embodiment, supervised learning is taken as an example, but unsupervised learning or semi-supervised learning may be used.

Figure 5:
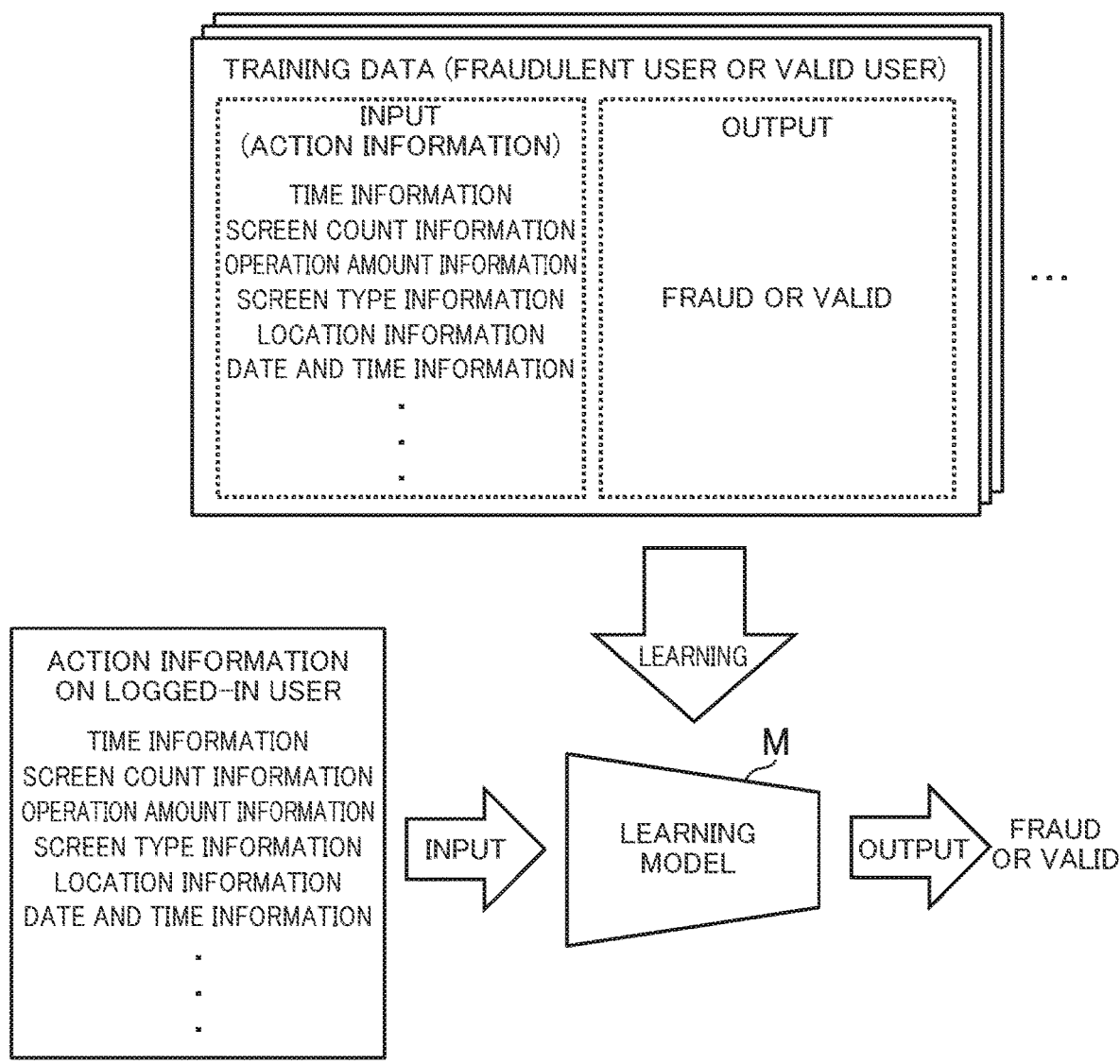
FIG. 5 is a diagram for illustrating an example of a learning model used by the fraud detection system.

FIG. 5 is a diagram for illustrating an example of the learning model used by the fraud detection system S. As illustrated in FIG. 5, a learning model M has learned training data created based on actions of a user who has been confirmed to be a fraudulent user or a valid user. An input portion of the training data has the same format as that of an actual input to the training model M, and an output portion of the training data has the same format as that of an actual output from the training model M.

As illustrated in FIG. 5, the training data includes, as the input portion, action information relating to the actions of a fraudulent user or a valid user. Details of the action information are described later. In the example of FIG. 5, the action information includes "time information," "screen count information," "operation amount information," "screen type information," "location information," and "date and time information." The training data includes, as the output portion, information indicating whether or not fraud is indicated. The output portion may be a score indicating a level of suspicion of fraud.

When the server 10 detects the login by a certain user to the SNS, the server 10 acquires the action information on the user based on the actions in at least a part of a period until display of the user information screen G3. When the user information screen G3 is displayed, the server 10 inputs the action information on the user to the learning model M. The server 10 acquires the output from the learning model M, and when the output indicates fraud, restricts the user from changing or registering the user information. When the output indicates valid, the server 10 permits the user to change or register the user information.

As described above, the fraud detection system S detects fraud by the user based on the action information on the user in at least a part of a period from detection of the login to the SNS to display of the user information screen G3. The fraud detection system enhances the accuracy of fraud detection by considering the series of actions performed until the user information screen G3 is displayed. The details of this technology are now described.

3. Functions Implemented by Fraud Detection System

Figure 6:
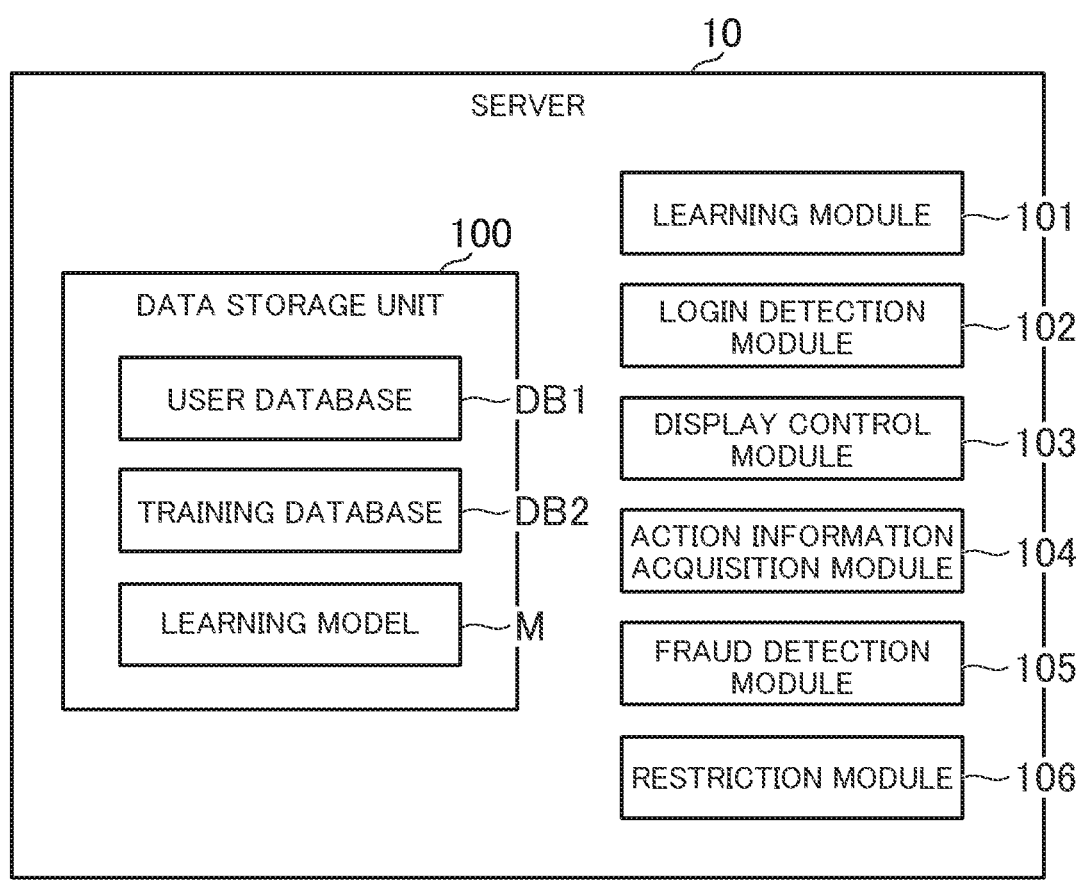
FIG. 6 is a functional block diagram for illustrating an example of functions implemented by the fraud detection system.

FIG. 6 is a functional block diagram for illustrating an example of functions implemented by the fraud detection system S. As illustrated in FIG. 6, on the server 10, a data storage unit 100, a learning module 101, a login detection module 102, a display control module 103, an action information acquisition module 104, a fraud detection module 105, and a restriction module 106 are implemented. The data storage unit 100 is implemented mainly by the storage unit 12. Each of the other functions is implemented mainly by the control unit 11.

[Data Storage Unit]

The data storage unit 100 stores data required for the fraud detection in this embodiment. For example, a user database DB1, a training database DB2, and the learning model M are stored in the data storage unit 100.

Figure 7:
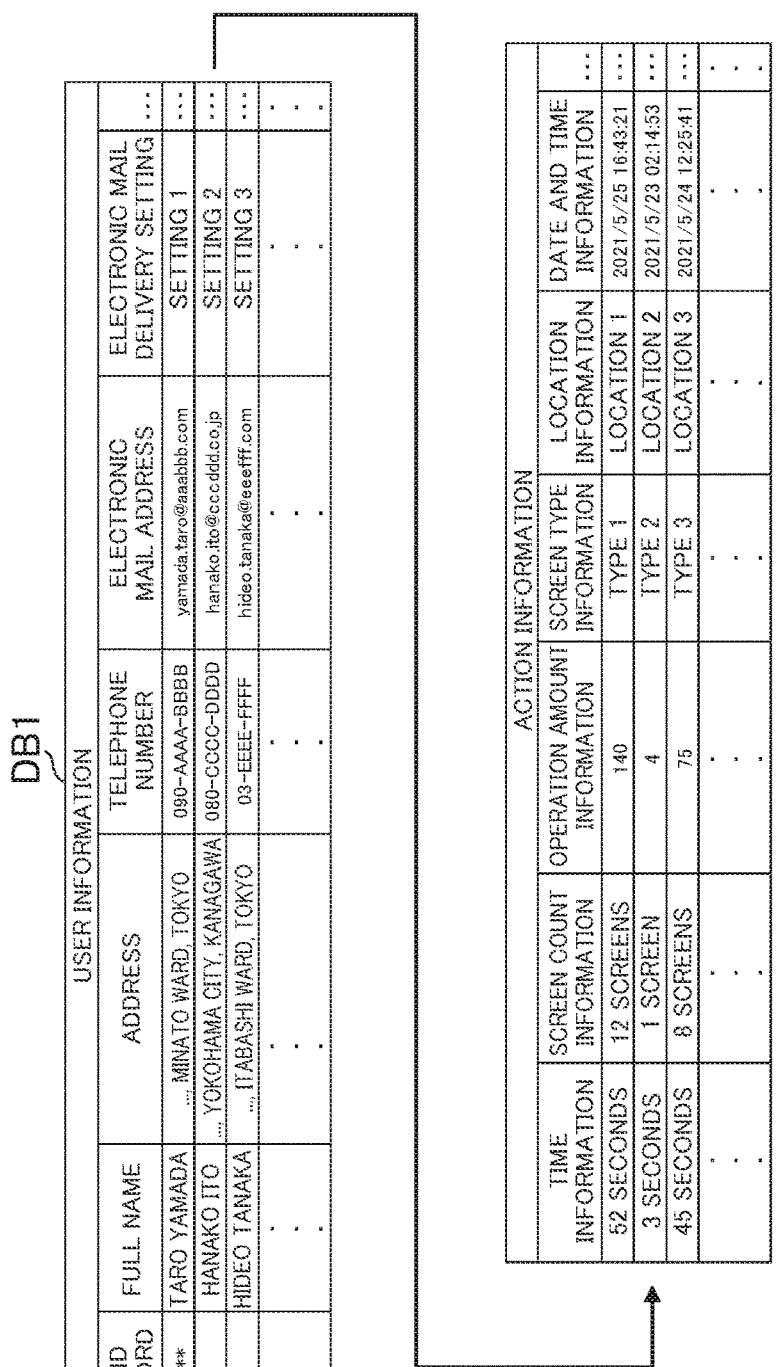
FIG. 7 is a table for showing a data storage example of a user database.

FIG. 7 is a table for showing a data storage example of the user database DB1. As shown in FIG. 7, the user database DB1 is a database in which information relating to users who have completed registration to use the SNS is stored. For example, the user ID, the user information, and the action information are stored in association with each other in the user database DB1. When a certain user completes registration to use the SNS, a new record is created in the user database DB1, and the user ID and user information on the user are stored. When the login using a certain user ID occurs, the action information associated with the user ID is updated.

The user ID is information that can identify the user. The user ID is also an example of user information in the sense that the user ID is information relating to the user. The user ID is required in order to log in to the SNS. The information that can identify the user may be information referred to by a name other than the user ID. For example, information referred to as a user name, a user account, or a login ID may correspond to the information that can identify the user.

In the example of FIG. 7, a case in which the first password, the second password, the full name, the address, the telephone number, the electronic mail address, and the electronic mail delivery setting are included in the user information is shown, but the user information may include any other information. Further, each of the plurality of items included in one piece of user information may correspond to the user information. That is, each item may be treated as a separate piece of user information. Specifically, for example, only the first password corresponds to one piece of user information, and only the second password corresponds to one piece of user information.

The action information is information relating to an action of the user in at least a part of the period from detection of the login to display of the user information screen G3. The period from detection of the login to display of the user information screen G3 is the period from a first time point at which the login is detected by the login detection module 102 to a second time point at which the user information screen G3 is displayed. In the fraud detection, it is sufficient that the actions in at least a part of this period are taken into consideration, and the actions before and after the period may also be taken into consideration. For example, actions performed on the user information screen G3 after the user information screen G3 is displayed may be considered. Further, for example, actions performed on the login screen G1 before the login may be considered.

In this embodiment, a case in which the point in time at which the server 10 transmits the display data of the user information screen G3 to the user terminal 20 corresponds to the second time point is described, but the second time point may be a point in time before or after that time point. For example, the second time point may mean the point in time at which the user terminal 20 receives the operation for displaying the user information screen G3, the point in time at which the server 10 receives information indicating that the operation for displaying the user information screen G3 has been performed, the point in time at which the display data of the user information screen G3 is generated by the server 10, the point in time at which the user terminal 20 receives the display data, or the point in time at which the user information screen G3 is actually displayed on the display unit 25.

The action information is acquired by the action information acquisition module 104 described later. In this embodiment, a case in which the action information is acquired based on the actions of user in the whole period from detection of the login to display of the user information screen G3 is described, but the action information may be acquired only based on an action of the user in a part of the period. The action information acquisition module 104 updates the action information associated with a user ID of a user based on operations of the user performed from the user terminal 20. The method of acquiring each piece of action information is described later.

FIG. 8 is a table for showing a data storage example of the training database DB2. As shown in FIG. 8, the training database DB2 is a database in which training data to be learned by the learning model M is stored. In this embodiment, a pair of an input to the learning model M and an output to be used as a correct answer is referred to as "training data (teacher data)." A collection of those pairs is stored in the training database DB2. The details of the training data are as described with reference to FIG. 5. The training data may be created manually by a creator of the learning model M, or may be created by using a known training data creation tool.

The data storage unit 100 stores the program and a parameter of the trained learning model M. The data storage unit 100 may store the learning model M before the training data is learned and a program required for learning the training data. The data stored in the data storage unit 100 is not limited to the example described above. The data storage unit 100 can store any data.

[Learning Module]

The learning module 101 causes the learning model M to learn the training data stored in the training database DB2. As the learning method itself of the learning model M, various methods can be used, for example, a gradient descent method or a backpropagation method can be used. As described above, a deep learning method or a reinforcement learning method may be used. The learning module 101 adjusts the parameter of the learning model M such that the output portion of the training data is output when the input portion of the training data is input.

[Login Detection Module]

The login detection module 102 detects a login of the user to the SNS. Detecting the login of the user means identifying the user ID of the user who has logged in. In this embodiment, when the login based on a user ID input in the input form F10 occurs, identifying the user ID corresponds to detecting the login of the user. In this embodiment, a case in which the login detection module 102 executes authentication at the time of the login is described, but the authentication may be executed by a functional block other than the login detection module 102. The authentication may be executed by a computer other than the server 10. In this case, the login detection module 102 detects the login of the user by acquiring, from another computer, the user ID of the user who has logged in.

For example, the login detection module 102 acquires the user ID and the first password input in the input forms F10 and F11 from the user terminal 20. The login detection module 102 determines whether or not the pair of the user ID and the first password exists in the user database DB1. When the pair exists in the user database DB1, the login detection module 102 detects the login by the user having the user ID included in the pair. For the login itself, various known processes can be used. When the user logs in to the SNS, the various services of the SNS are provided to the user.

In the case of a user who has registered the second password, the login detection module 102 may determine whether or not the combination of the user ID, first password, and second password input by the user exists in the user database DB1. When the combination exists in the user database DB1, the login detection module 102 detects the login by the user having the user ID included in the combination. In a case in which another authentication is executed at the time of the login to the SNS, the login detection module 102 may detect the login of the user by determining whether or not the another authentication is successful.

[Display Control Module]

The display control module 103 displays the user information screen G3 for changing or registering the user information on the display unit 25 of the user terminal 20 of the user who has logged in to the SNS. In this embodiment, the server 10 includes the display control module 103, and therefore the display control module 103 displays the user information screen G3 on the display unit 25 by transmitting the display data required for displaying the user information screen G3 to the user terminal 20. The user information screen G3 is not limited to a screen for registering or changing the second password, and may be a screen for registering or changing any other item included in the user information.

The display data of the user information screen G3 may have any format, and may be HTML data, for example, when the user information screen G3 is displayed by using a browser. When the user information screen G3 is displayed by using the SNS application, the display data may be image data which fits in a frame defined in the application. The display data may be stored in advance in the data storage unit 100, or may be generated on the spot from the data stored in the data storage unit 100.

The display control module 103 displays the user information screen G3 on the display unit 25 when a predetermined operation is performed by a certain user after the user logs in to the SNS. In this embodiment, a case in which this operation is an operation for selecting the icon I21 on the home screen G2 is taken as an example, but the operation may be any operation as long as the operation is an operation for displaying the user information screen G3. The user can perform other operations for using the SNS before this operation is performed. Examples of other operations include an operation for displaying another screen, such as a talk screen including a message with a friend, a timeline screen including a timeline of a friend, a news screen including a news article, and a wallet screen for executing payment.

[Action Information Acquisition Module]

The action information acquisition module 104 acquires action information relating to an action of the user in at least a part of the period from detection of the login to display of the user information screen G3. When the login based on a certain user ID is detected, the action information acquisition module 104 generates action information associated with the user ID, and stores the generated action information in the user database DB1. The action information acquisition module 104 updates the action information when data indicating some sort of action of the user is received from the user terminal 20. The method of updating the action information may be a method corresponding to the type of information included in the action information.

For example, the action information includes time information relating to a length of time of at least a part of the period from detection of the login to display of the user information screen G3. When the login of a certain user is detected, the action information acquisition module 104 acquires the current date and time, and records the acquired date and time in the data storage unit 100 as the first time point. The current date and time may be acquired by using a real-time clock, for example. When the user information screen G3 is displayed, the action information acquisition module 104 acquires the current date and time, and records the acquired date and time in the data storage unit 100 as the second time point. The action information acquisition module 104 calculates the length of time from the first time point to the second time point, and acquires the calculated length of time as time information. The method itself of measuring the length of time may be any method, and may be a method of measuring an elapsed time from the first time point by a predetermined timekeeping process instead of calculating the difference between the first time point and the second time point.

For example, the action information includes screen count information relating to the number of screens displayed in at least a part of the period from detection of the login to display of the user information screen G3. The action information acquisition module 104 sets, when the login of a certain user is detected, an initial value (for example, 0 or 1) as the screen count information associated with the user ID of the user. After that, the action information acquisition module 104 increments the screen count information each time some sort of screen in the SNS is displayed. The action information acquisition module 104 may increment the screen count information only when a specific screen is displayed. The action information acquisition module 104 increments the screen count information until the user information screen G3 is displayed.

For example, the action information includes operation amount information relating to the operation amount in at least a part of the period from detection of the login to display of the user information screen G3. The operation amount is the amount of operations, for example, the number of times an operation such as clicking or tapping is performed, or a movement distance of a designated position using a pointing device (for example, movement distance of a pointer). When the login of a certain user is detected, the action information acquisition module 104 sets an initial value (for example, 0 or 1) as the operation amount information associated with the user ID of the user. After that, the action information acquisition module 104 increments the operation amount information each time the fact that some sort of operation in the SNS has been performed is received from the user terminal 20. The action information acquisition module 104 may increment the operation amount information only when a specific operation is performed. The action information acquisition module 104 increments the operation amount information until the user information screen G3 is displayed.

For example, the action information includes screen type information relating to the types of screens displayed in at least a part of the period from detection of the login to display of the user information screen G3. When the login of a certain user is detected and the home screen G2 is displayed, the action information acquisition module 104 adds information that can identify the home screen G2 to the screen type information associated with the user ID of the user. After that, the action information acquisition module 104 updates the screen type information such that each time some sort of screen in the SNS is displayed, information that can identify the screen is added. The action information acquisition module 104 may update the screen type information only when a specific screen is displayed. The action information acquisition module 104 updates the screen type information until the user information screen G3 is displayed.

The action information may include other information. The action information acquisition module 104 may acquire the action information by an acquisition method corresponding to information to be used as the action information. For example, when location information relating to the location of the user terminal 20 is included in the action information, the action information acquisition module 104 may acquire the location information based on an IP address of the user terminal 20. Any method can be used as the method itself of acquiring the location information. For example, a wireless LAN access point, mobile base station information, or a GNSS such as a GPS may be used.

For example, when the action information includes date and time information relating to the current date and time in addition to the time information, the action information acquisition module 104 may acquire the current date and time as date and time information. Instead of the date and time, only the time may be used, or a time period may be used. The action information may be any information relating to an action of the user, and may be, for example, device information that can identify the user terminal 20, a model of the user terminal 20, an operating system, the type of browser, a language used, or a combination thereof. Those items correspond to action information because the items are used when the user performs some sort of action. The action information acquisition module 104 may acquire the action information by an acquisition method corresponding to the type of information to be used as the action information.

[Fraud Detection Module]

The fraud detection module 105 detects fraud by the user based on the action information. In this embodiment, the fraud detection module 105 detects fraud by the user based on the action information and the learning model M for detecting fraud in the SNS. When the fraud detection module 105 inputs the action information to the learning model M, the learning model M outputs a detection result of fraud corresponding to the input action information. The fraud detection module 105 acquires the output from the learning model M and detects fraud by the user.

In this embodiment, as described with reference to FIG. 5, the learning model M outputs information indicating whether or not fraud is indicated. When the fraud detection module 105 inputs the action information on a certain user to the learning model M and obtains an output indicating fraud, the fraud detection module 105 determines that the user is a fraudulent user. When the fraud detection module 105 inputs the action information on the certain user to the learning model M and obtains an output indicating valid, the fraud detection module 105 determines that the user is a valid user. Determining that the user is a valid user is equivalent to not determining that the user is a fraudulent user.

In a case in which the learning model M outputs a score indicating a level of suspicion of fraud, when the fraud detection module 105 inputs the action information on the certain user to the learning model M and obtains a score equal to or higher than a threshold value as an output, the fraud detection module 105 determines that the user is a fraudulent user. When the fraud detection module 105 inputs the action information on the certain user to the learning model M and obtains a score lower than the threshold value as an output, the fraud detection module 105 determines that the user is a valid user.

In this embodiment, the action information includes the time information, and therefore the fraud detection module 105 detects fraud by the user based on the time information. In this embodiment, a case in which information other than the time information is comprehensively considered by the learning model M is described, but the fraud detection module 105 may determine that a certain user is a fraudulent user when the time indicated by the time information on the user is less than a threshold value. The fraud detection module 105 may determine that the certain user is a valid user when the time indicated by the time information on the user is equal to or longer than the threshold value.

In this embodiment, the action information includes the screen count information, and therefore the fraud detection module 105 detects fraud by the user based on the screen count information. In this embodiment, a case in which information other than the screen count information is comprehensively considered by the learning model M is described, but the fraud detection module 105 may determine that a certain user is a fraudulent user when the number of screens indicated by the screen count information on the user is less than a threshold value. The fraud detection module 105 may determine that the certain user is a valid user when the number of screens indicated by the screen count information on the user is equal to or larger than the threshold value.

In this embodiment, the action information includes the operation amount information, and therefore the fraud detection module 105 detects fraud by the user based on the operation amount information. In this embodiment, a case in which information other than the operation amount information is comprehensively considered by the learning model M is described, but the fraud detection module 105 may determine that a certain user is a fraudulent user when the operation amount indicated by the operation amount information on the user is less than a threshold value. The fraud detection module 105 may determine that the certain user is a valid user when the operation amount indicated by the operation amount information on the user is equal to or larger than the threshold value.

In this embodiment, the action information includes screen type information, and therefore the fraud detection module 105 detects fraud by the user based on the screen type information. In this embodiment, a case in which information other than the operation amount information is comprehensively considered by the learning model M is described, but the fraud detection module 105 may determine that a certain user is a fraudulent user when a specific screen is not included in the screens indicated by the screen type information on the user. The fraud detection module 105 may determine that the user is a valid user when the specific screen is included in the screens indicated by the screen type information on the user.

The specific screen is a screen that a valid user would probably display. For example, the specific screen is a screen which is accessed by valid users relatively often. The specific screen is a screen which is accessed by fraudulent users relatively rarely. The specific screen may be any screen other than the user information screen G3. The specific screen may be determined based on past statistics. For example, when it is identified from past statistics that valid users often display a game screen, but fraudulent users rarely display the game screen, then the specific screen may be the game screen.

The specific screen may be a screen which fraudulent users often display before the user information screen G3. For example, when it is identified based on past statistics that fraudulent users tend to display the user information screen G3 after displaying the talk screen, the specific screen may be the talk screen. In this case, the fraud detection module 105 may determine that a certain user is a fraudulent user when the specific screen is included in the screens indicated by the screen type information on the user. The fraud detection module 105 may determine that a certain user is a valid user when the specific screen is not included in the screens indicated by the screen type information on the user.

In this embodiment, the user information includes authentication information relating to authentication in the SNS. A case in which the authentication information is the second password is taken as an example, but the authentication information may be the first password or other authentication information. Accordingly, "second password" as used in this embodiment can be read as "authentication information" or "user information." The fraud detection module 105 detects, when the second password is changed or registered on the user information screen G3, fraud by the user based on the action information. In the example of FIG. 2, the fraud detection module 105 detects fraud by the user when the link "register or change second password" in the menu M22 is selected. It is assumed that until that point the action information has been collected, but detection of fraud by the user has not been performed.

The fraud detection module 105 can detect fraud by the user at any time. For example, even when the link "register or change second password" on the user information screen G3 is not selected, fraud by the user may be detected when the user information screen G3 is displayed. As another example, the fraud detection module 105 may detect fraud by the user when the link "change first password" on the user information screen G3 is selected. Other times are described in the modification examples described later.

Further, the fraud detection module 105 may detect fraud by using the above-mentioned rule-based model instead of detecting fraud by using the learning model M. Moreover, for example, the fraud detection module 105 may determine each of the items described with regard to the fraud detection method using time information and screen count information, for example, and determine that a user is a fraudulent user when a predetermined number or more of the items are determined to be fraud. The fraud detection module 105 can execute any fraud detection using the action information.

[Restriction Module]

The restriction module 106 or restricts change registration of the user information on the user information screen G3 when fraud by the user is detected. In this embodiment, a case in which prohibiting change or registration of the user information corresponds to restriction is described, but it is sufficient that a case in which the user information is prevented from being freely changed or registered corresponds to restriction. For example, a case in which change or registration of a part of the user information may be permitted but change or registration of another part of the user information is prohibited may correspond to restriction. In this embodiment, the target of restriction is the second password, and therefore the restriction module 106 restricts change or registration of the second password on the user information screen G3 when fraud by the user is detected.

4. Processing to be Executed in Fraud Detection System

Figure 9:
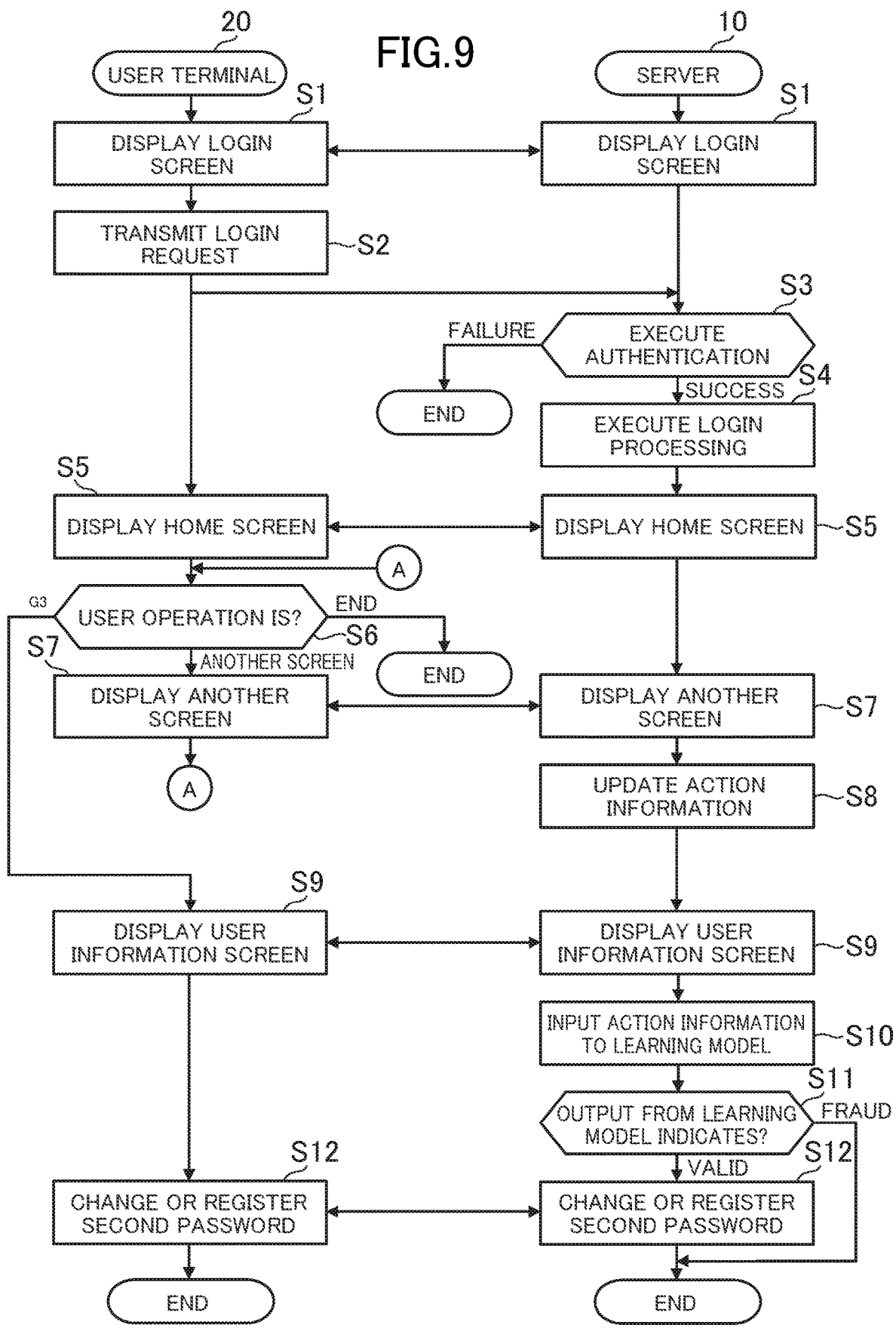
FIG. 9 is a flow chart for illustrating an example of processing to be executed in the fraud detection system.

FIG. 9 is a flow chart for illustrating an example of processing to be executed in the fraud detection system S. This processing is executed by the control units 11 and 21 operating in accordance with the programs stored in the storage units 12 and 22. This processing is an example of processing to be executed by the functional blocks illustrated in FIG. 6.

As illustrated in FIG. 9, the user terminal 20 accesses the server 10 and displays the login screen G1 on the display unit 25 when the SNS application is started or an SNS URL is designated from the browser (Step S1). When the user ID and the first password are input to the input forms F10 and F11 and the button B12 is selected, the user terminal 20 transmits a login request including the input user ID and first password to the server 10 (Step S2).

When the server 10 receives the login request, the server 10 executes authentication based on the user database DB1 (Step S3). In Step S3, authentication is successful when the pair of the user ID and first password included in the login request exists in the user database DB1. When the pair does not exist in the user database DB1, authentication fails. When authentication fails ("failure" in Step S3), this process ends. When authentication is successful ("success" in Step S3), the server 10 executes login processing to the SNS (Step S4).

When the login processing is executed, processing for displaying the home screen G2 is executed between the server 10 and the user terminal 20 (Step S5), and the user terminal 20 receives an operation by the user (Step S6). Here, it is assumed that an operation for displaying a screen other than the user information screen G3 for changing or registering the second password is performed, an operation for displaying the user information screen G3 for changing or registering the second password is performed, or a predetermined end operation is performed.

When an operation for displaying another screen is performed ("another screen" in Step S6), processing for displaying the another screen, such as the talk screen or the timeline screen, is executed between the server 10 and the user terminal 20 (Step S7). When the server 10 receives data relating to some sort of action by the user from the user terminal 20, the server 10 updates the action information associated with the user ID of the logged-in user (Step S8). The method of updating the action information is as described with regard to the processing of the action information acquisition module 104.

When an operation for displaying the user information screen G3 for changing or registering the second password is performed ("G3" in Step S6), processing for displaying the user information screen G3 for changing or registering the second password is executed between the server 10 and the user terminal 20 (Step S9). The server 10 inputs the action information associated with the user ID of the logged-in user to the learning model M (Step S10), and acquires the output from the learning model M (Step S11).

When the output from the learning model M indicates valid ("valid" in Step S11), processing for changing or registering the second password is executed between the server 10 and the user terminal 20 (Step S12), and this process ends. When the output from the learning model M indicates fraud ("fraud" in Step S11), processing for changing or registering the user information is not executed between the server 10 and the user terminal 20, and a predetermined error message is displayed on the user terminal 20. When an end operation is performed ("end" in Step S6), this process ends.

According to the fraud detection system S of this embodiment, fraud by the user is detected based on the action information relating to an action of the user in at least a part of the period from detection of the login to display of the user information screen G3. A series of actions of the user can be comprehensively considered, and hence the accuracy of fraud detection is enhanced. As a result, the SNS is prevented from being fraudulently used, and security in the SNS is enhanced.

Further, the fraud detection system S detects fraud by the user based on time information relating to a length of time of at least a part of the period from detection of the login to display of the user information screen G3. Fraudulent users often display the user information screen G3 immediately after logging in to the SNS, and hence, by considering the time information, it is possible to identify an action similar to that performed by fraudulent users, and the accuracy of fraud detection is further enhanced.

Further, the fraud detection system S detects fraud by the user based on screen count information relating to the number of screens displayed in at least a part of the period from detection of the login to display of the user information screen G3. Fraudulent users often display the user information screen G3 without going through other screens after logging in to the SNS, and hence, by considering the screen count information, it is possible to identify an action similar to that performed by fraudulent users, and the accuracy of fraud detection is further enhanced.

Further, the fraud detection system S detects fraud by the user based on the operation amount information relating to the operation amount in at least a part of the period from detection of the login to display of the user information screen G3. Fraudulent users often display the user information screen G3 without performing many other operations after logging in to the SNS, and hence, by considering the operation amount information, it is possible to identify an action similar to that performed by fraudulent users, and the accuracy of fraud detection is further enhanced.

Further, the fraud detection system S detects fraud by the user based on screen type information relating to the types of screens displayed in at least a part of the period from detection of the login to display of the user information screen G3. The screen transitions of fraudulent users from the login to the SNS to display of the user information screen G3 have many characteristic features, and by considering the screen type information, it is possible to identify an action similar to that performed by fraudulent users, and the accuracy of fraud detection is further enhanced.

Further, the fraud detection system S detects fraud by the user based on the action information when the second password is changed or registered on the user information screen G3. As a result, it is possible to prevent the second password from being changed or registered, and therefore security in the SNS is enhanced. As a result, it is possible to prevent a situation in which a valid user is prevented from logging in with his or her own user ID. Moreover, by setting the timing of changing or registering the second password, which is easily targeted by fraudulent users, as the timing of fraud detection, fraud can be detected at a more optimal timing. For example, the processing load on the server 10 can be reduced by not executing the fraud detection processing at other times.

Further, the fraud detection system S restricts change or registration of the user information on the user information screen G3 when fraud by the user is detected. As a result, it is possible to prevent the user information from being changed or registered, and therefore security in the SNS is enhanced.

Further, the fraud detection system S detects fraud by the user based on the action information and the learning model M for detecting fraud in the SNS. The learning model M learns, for example, a recent trend of fraudulent users without a rule being manually defined by an administrator, and the accuracy of fraud detection is further enhanced.

5. Modification Examples

The present disclosure is not limited to the embodiment described above, and can be modified suitably without departing from the spirit of the present disclosure.

Figure 10:
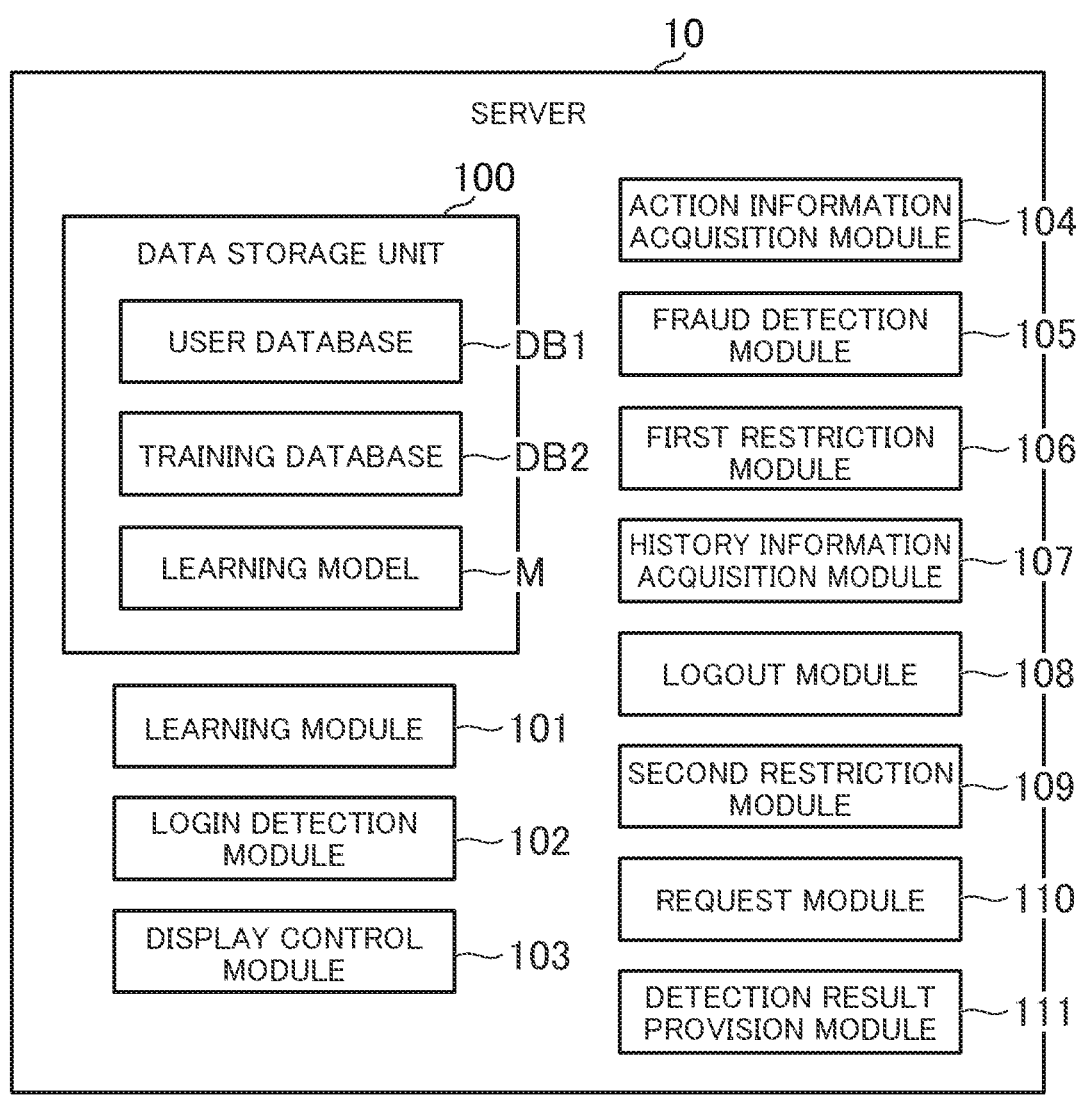
FIG. 10 is a functional block diagram in modification examples of the present disclosure.

FIG. 10 is a functional block diagram in the modification examples. In FIG. 10, the restriction module 106 described in the embodiment is referred to as "first restriction module 106." As illustrated in FIG. 10, in the modification examples described below, a history information acquisition module 107, a logout module 108, a second restriction module 109, a request module 110, and a detection result provision module 111 are implemented in addition to the functions described in the embodiment. Each of those functions is mainly implemented by the control unit 11.

5-1. Modification Example 1

For example, the fraud detection system S may further include the history information acquisition module 107 which acquires history information relating to an action history of the user at the time of a past login. The action history is a time-series record of actions performed in the past. The history information may show all or a part of the action history from the login by the user to the SNS in the past to logout, or may show all or a part of the action history from the past login to the current login without particularly logging out. The history information is assumed to be stored in the user database DB1, but may be stored in another database.

For example, the history information includes at least one of information that can identify a screen displayed on the display unit 25 of the user terminal 20 or information that can identify content of an operation on this screen. The history information may also include information that can identify a date and time when each action is performed. When a certain user logs in to the SNS, the server 10 updates the history information associated with the user ID of the user based on content of communication to and from the user terminal 20 of the user. For example, when a certain screen is displayed on the user terminal 20, the server 10 adds information that can identify the screen to the history information. When the server 10 is notified from the user terminal 20 that a certain operation has been performed, the server 10 adds information that can identify content of the operation to the history information.

The fraud detection module 105 in this modification example detects fraud by the user based on a difference between the action information and the history information. The difference is a difference between the actions in at least a part of the period from the detection of the current login to display of the user information screen G3 and the actions in at least a part of the period from the detection of the past login to display of the user information screen G3. The difference can also be referred to as "distinction."

Like in the embodiment, when the learning model M is used, the difference between the action information and the history information is one of the feature amounts input to the learning model M. The learning model M has learned a relationship between the difference between the action information and the history information of a certain user and whether or not the user is a fraudulent user. The fraud detection module 105 detects the fraud by the user by inputting the difference between the action information and the history information of the logged-in user to the learning model M and acquiring the output from the learning model M.

In this modification example, a case in which information other than the difference between the action information and the information is also history comprehensively considered by the learning model M is described, but the fraud detection module 105 may determine that a certain user is a fraudulent user when the difference between the action information and the history information on the certain user is equal to or larger than a threshold value. The fraud detection module 105 may determine that a certain user is a valid user when the difference between the action information and the history information on the user is less than the threshold value.

According to Modification Example 1, fraud by the user is detected based on the difference between the action information and the history information relating to the action history of a user at the past login. The trend of actions by a user may differ from user to user, and therefore the accuracy of fraud detection is further improved by considering the difference from the action history showing the usual actions of each user.

5-2. Modification Example 2

For example, the user information may include usage condition information relating to a usage condition in the SNS. The usage condition is a condition referred to when the SNS is used. The usage condition may define a usage range of the SNS. The usage condition may be any condition corresponding to the content of the service. In the case of the SNS described in the embodiment, the usage condition may be a disclosure range of posts, and the usage condition may correspond to a maximum usage amount per electronic payment using a wallet, a maximum usage amount in a predetermined period, a maximum top-up amount of electronic money at one time, or a maximum top-up amount in a predetermined period.

The usage condition information is stored in the user database DB1. When the SNS is used by a certain user, the server 10 provides the SNS based on the usage condition information associated with the user ID of the user. The usage condition information can be changed or registered from the user information screen G3. For example, a link such as "change or register usage condition information" may be displayed on the user information screen G3, and when the link is selected, the usage condition information may be changed or registered.

The fraud detection module 105 detects fraud by the user based on the action information when the usage condition information is changed or registered on the user information screen G3. For example, the fraud detection module 105 detects fraud by the user when the link "change or register usage condition information" on the user information screen G3 is selected. It is assumed that until that point the action information has been collected, but detection of fraud by the user has not been performed. The fraud detection method itself is as described in the embodiment.

According to Modification Example 2, when the usage condition information is changed or registered on the user information screen G3, fraud by the user is detected based on the action information. As a result, it is possible to prevent the usage condition information from being changed or registered, and therefore security in the SNS is enhanced. As a result, it is possible to prevent a fraudulent user from using the SNS on their own under a usage condition not intended by the valid user. Further, by setting the timing of changing or registering the usage condition information, which is easily targeted by fraudulent users, as the timing of fraud detection, fraud can be detected at a more optimal timing. For example, the processing load on the server 10 can be reduced by not executing the fraud detection processing at other times.

5-3. Modification Example 3

For example, the user information may include provision destination information relating to a provision destination of an item to be provided in the SNS. The item is a product provided by the SNS or an item required in order to use the SNS. For example, in the example of an electronic payment service described later instead of an SNS, a card such as a credit card may correspond to the item. The product may be a tangible product or an intangible product, such as moving image data or music data. When the product is a tangible product, the delivery address corresponds to the provision destination. In this case, it is assumed that the product can be ordered from the SNS. When the product is an intangible product, the destination of the data corresponds to the provision destination. The data can be provided by any medium, for example, by SNS, electronic mail, a message app, or a file transfer protocol. That is, in the case of an intangible product, an SNS account or an electronic mail address, for example, corresponds to the provision destination.

The provision destination information is stored in the user database DB1. When a certain user has ordered an item by using the SNS, the server 10 provides the item based on the provision destination information associated with the user ID of the user. The provision destination information can be changed or registered from the user information screen G3. In the example of FIG. 2, when the link "change or register address" in the menu M22 is selected, the user information screen G3 for changing or registering the provision destination information is displayed. On the user information screen G3, input of provision destination information is received. Users who have not registered provision destination information register the provision destination information instead of changing the provision destination information.

The fraud detection module 105 detects fraud by the user based on the action information when the provision destination information is changed or registered on the user information screen G3. For example, the fraud detection module 105 detects fraud by the user when the link "change or register address" on the menu M22 is selected. It is assumed that until that point the action information has been collected, but detection of fraud by the user has not been performed. The fraud detection method itself is as described in the embodiment.

According to Modification Example 3, when the provision destination information is changed or registered on the user information screen G3, fraud by the user is detected based on the action information. As a result, it is possible to prevent the provision destination information from being changed or registered, and therefore security in the SNS is enhanced. As a result, it is possible to prevent the product, for example, to be provided by the SNS from being provided to a location not intended by the valid user. Further, by setting the timing of changing or registering the provision destination information, which is easily targeted by fraudulent users, as the timing of fraud detection, fraud can be detected at a more optimal timing. For example, the processing load on the server 10 can be reduced by not executing the fraud detection processing at other times.

5-4. Modification Example 4

For example, the fraud detection system S may include the logout module 108 which forcibly logs out the user logged in to the SNS when fraud by the user is detected. As the method itself of forcibly logging out the user, various known methods can be used. For example, the information for identifying the login state of the user may be deleted on the server 10 side. The information may be any information, for example, a session for ID maintaining a session, authentication information temporarily enabled in order to maintain a login state, or information held in a cookie. The logout module 108 forcibly logs out a certain user on condition that fraud by the user is detected. When fraud by the user is not detected, the logout module 108 does not forcibly log out the user and maintains the login state.

According to Modification Example 4, when fraud by the user is detected, the user logged in to the SNS is forcibly logged out. As a result, it is possible to prevent fraud, for example, user information being changed or registered, and security in the SNS is enhanced. It is also possible to prevent other fraud from occurring by executing forced logout.

5-5. Modification Example 5

For example, the fraud detection system S may include the second restriction module 109 which restricts, when fraud by the user is detected, the provision of the SNS based on the user information changed or registered on the user information screen G3. In this modification example, a case in which prohibiting the provision of the SNS based on the user information corresponds to restriction is described, but, for example, a case in which a part of the functions of the SNS based on the user information are permitted but provision of the other functions is prohibited may correspond to restriction. In this embodiment, the target of restriction is the second password, and therefore the second restriction module 109 restricts the login using the second password when fraud by the user is detected. Further, for example, when the second password is required during electronic payment in the SNS, the second restriction module 109 restricts permission of electronic payment by executing authentication based on the second password.

According to Modification Example 5, when fraud by the user is detected, the provision of the SNS based on the user information changed or registered on the user information screen G3 is restricted. As a result, it is possible to prevent the SNS from being fraudulently used, and security in the SNS is enhanced.

5-6. Modification Example 6

For example, the fraud detection system S may include the request module 110 which requests, when fraud by the user is detected, before the SNS is provided based on the user information changed or registered on the user information screen G3, the user to perform authentication which is not requested when fraud by the user is not detected. The authentication may be authentication of any type, and is different from, for example, authentication at the time of the login. When the user has not registered the second password, the authentication is different from the authentication of inputting the user ID and the first password. When the user has registered the second password, the authentication is different from the authentication of inputting the user ID, the first password, and the second password.

The authentication requested by the request module 110 may be authentication completed in the user terminal 20 (for example, biometric authentication using biometric information registered in the user terminal 20), but in this modification example, the requested authentication is authentication using the authentication information registered in the user database DB1. For example, the biometric information may be registered in the user database DB1, and biometric authentication based on the registered biometric information and biometric information input from the user terminal 20 may be requested. As another example, third password or a personal identification number may be registered in the user database DB1, and authentication using the registered third password or personal identification number may be requested.

When fraud by a certain user is detected, the request module 110 requests the above-mentioned any type of authentication for the user ID under which the user is logged in. When the user uses the SNS, the server 10 permits the SNS to be used on condition that the authentication is successful. When the authentication is not successful, the server 10 restricts the use of the SNS by the user. In this modification example, a case in which prohibiting the use of the SNS corresponds to restriction is described, but, for example, a case in which use of a part of the functions of the SNS is permitted but use of the other functions is prohibited may correspond to restriction.

According to Modification Example 6, when fraud by the user is detected, the user is requested to perform, before the SNS is provided based on the user information changed or registered on the user information screen G3, authentication which is not requested when fraud by the user is not detected. As a result, it is possible to prevent the SNS from being fraudulently used, and security in the SNS is enhanced.

5-7. Modification Example 7

For example, the display control module 103 may display, before the user information screen G3 is displayed, a determination criterion screen to be used as a determination criterion of fraud detection on the display unit 25. The determination criterion screen is a screen on which the actions of fraudulent users and valid users tend to be different. For example, the determination criterion screen is a screen that a fraudulent user passes through without performing any operation, but a valid user performs some sort of operation on the screen. In this modification example, a case in which a screen for displaying a campaign in which predetermined benefits, for example, coupons or points, can be obtained corresponds to the determination criterion screen is described.

Figure 11:
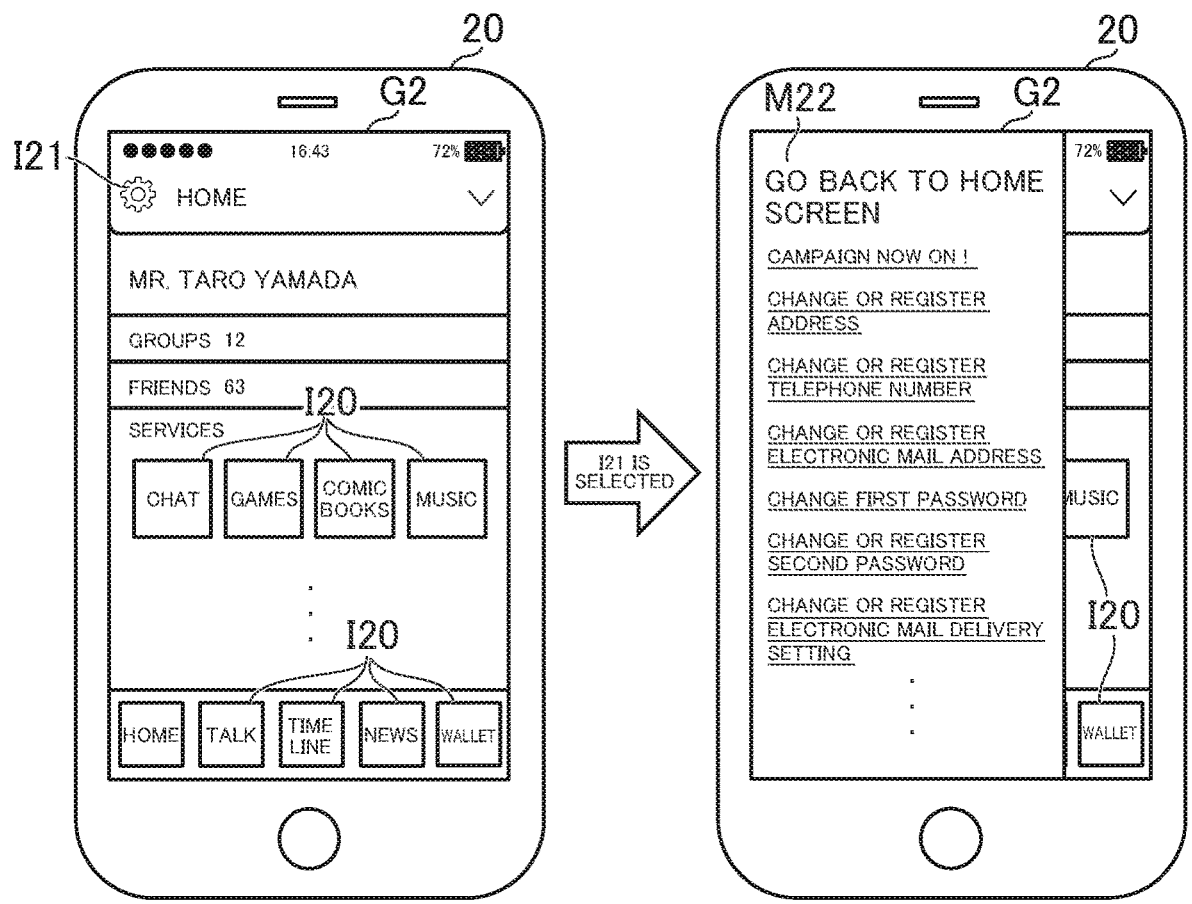
FIG. 11 is a diagram for illustrating an example of a determination criterion screen.

FIG. 11 is a diagram for illustrating an example of the determination criterion screen. In the example of FIG. 11, the menu M22 displays information relating to the campaign. Thus, the home screen G2 on which the menu M22 is displayed is an example of the determination criterion screen. Valid users are often interested in the campaign displayed on the menu M22, and transition to the screen for receiving the benefits of the campaign (for example, a screen for entering the campaign). Fraudulent users often transition to the user information screen G3 without selecting the campaign displayed on the menu M22.

Which screen is to be used as the determination criterion screen may be determined based on statistics of past actions of fraudulent users and valid users. In this case, when there is a certain degree of difference between the actions of fraudulent users on a certain screen and the actions of valid that users on the screen, screen is adopted as the determination criterion screen. The server 10 may determine the screen to be used as the determination criterion screen by aggregating an access count and operation content of each fraudulent user and valid user for each screen provided by the SNS. Further, for example, the server 10 may identify, for each valid user, the content of a campaign which is likely to be of interest to the valid user from the past action history of the valid user, and when there is a login to the SNS using the user ID of the valid user, may display the campaign that the valid user is likely to be interested in.

The action information in this modification example includes the operation information relating to the operation on the determination criterion screen by the user. The operation information indicates the content of the operation by the user performed when the determination criterion screen is displayed. For example, the operation information is whether or not an image such as an icon displayed on the determination criterion screen has been selected, the amount of movement of a cursor, or the amount of scrolling.

The fraud detection module 105 detects fraud by the user based on the operation information. Like in the embodiment, when the learning model M is used, the operation information becomes one of the feature amounts input to the learning model M. The learning model M has learned the relationship between the action information which includes the operation information and whether or not the user is a fraudulent user. The fraud detection module 105 detects the fraud by the user by inputting the action information including the operation information acquired from the logged-in user to the learning model M and acquiring the output from the learning model M.

In this modification example, a case in which information other than operation information is also comprehensively considered by the learning model M is described, but the fraud detection module 105 may determine that a certain user is a fraudulent user when the operation information on the user does not indicate that a specific operation has been performed. The fraud detection module 105 may determine that a certain user is a valid user when the operation information on the user indicates that the specific operation has been performed.

The specific operation is an operation that a valid user is considered to perform. For example, the specific operation is selecting the campaign link displayed on the determination criterion screen. As another example, the operations performed by a user confirmed to be a valid user may be aggregated, and an operation having a large aggregate count may be used as the specific operation.

The specific operation may be an operation that a fraudulent user is considered to perform. For example, the operations performed by a user confirmed to be a fraudulent user may be aggregated, and an operation having a large aggregate count may be used as the specific operation. In this case, the fraud detection module 105 may determine that a certain user is a fraudulent user when the operation information on the user indicates that the specific operation has been performed. The fraud detection module 105 may determine that a certain user is valid user when the operation information on the user does not indicate that the specific operation has been performed.

According to Modification Example 7, fraud by the user is detected based on operation information relating to an operation by the user on the determination criterion screen. The accuracy of fraud detection is further enhanced by considering the operation by the user on the determination criterion screen, which facilitates determining whether or not the user is a fraudulent user.

5-8. Modification Example 8

For example, the display control module 103 may display on the display unit 25 a first user information screen for changing or registering first user information and a second user information screen for changing or registering second user information. That is, a plurality of pieces of user information may be changed or registered one after another. Fraudulent users may change or register a plurality of pieces of user information one after another, but valid users rarely change or register a plurality of pieces of user information one after another. Accordingly, fraud may be detected based on the action of changing or registering a plurality of pieces of user information one after another.

In this modification example, a case in which a third password different from the first password and the second password exists is taken as an example. For example, the first user information screen is a screen for changing or registering the second password being the first user information. The second user information screen is a screen for changing or registering a third password being the second user information. The third password may be used at the time of the login, but in this modification example, the third password is used for a predetermined service. For example, an authentication password called "3D Secure," which is required at the time of using a credit card registered in a wallet, may correspond to the third password.

Figure 12:
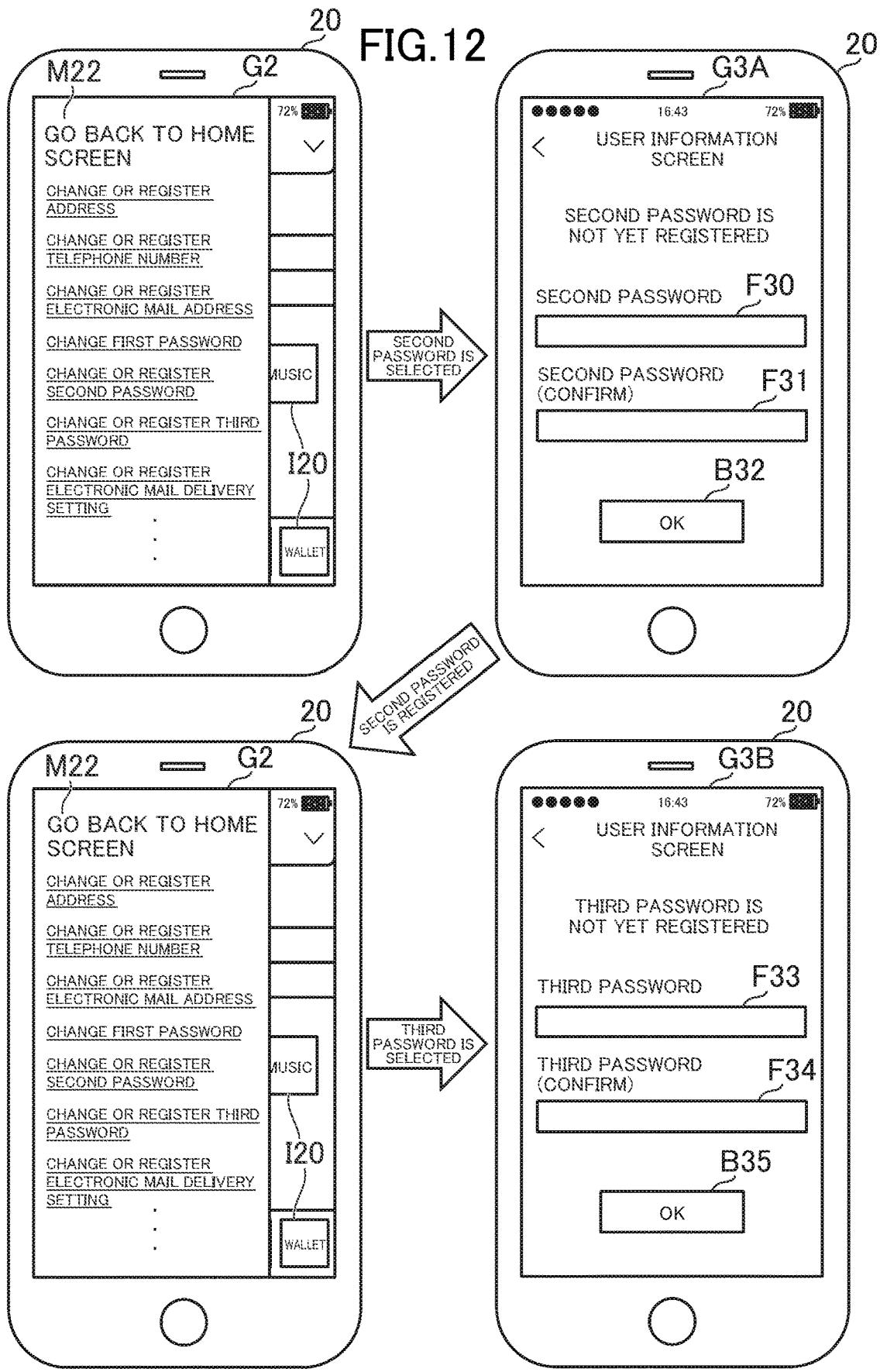
FIG. 12 is a diagram for illustrating an example of how a plurality of pieces of user information are changed or registered one after another.

FIG. 12 is a diagram for illustrating an example of how a plurality of pieces of user information are changed or registered one after another. As illustrated in FIG. 12, the action information is acquired as first action information relating to an action of the user in at least a part of the period from detection of the login to the display of a first user information screen G3A and second action information relating to an action of the user in at least a part of the period from display of the first user information screen G3A to display of a second user information screen G3B. The first action information and the second action information differ only in the target period, and the items of each piece of action information and the acquisition method itself are the same as for the action information described in the embodiment.

The fraud detection module 105 detects fraud by the user based on the first action information and the second action information. For example, the learning model M may learn a relationship between the first action information and second action information and whether or not the user is a fraudulent user. In this case, the fraud detection module 105 inputs the first action information and the second action information to the learning model M, and determines whether or not the output acquired from the learning model M indicates fraud. The fraud detection module 105 may also detect fraud by the user based on a first output acquired from the learning model M by inputting the first action information to the learning model M and a second output acquired from the learning model M by inputting the second action information to the learning model M.

Moreover, for example, the fraud detection module 105 may detect fraud by the user in the same manner as described in the embodiment instead of using the learning model M. For example, the fraud detection module 105 may determine that the user is a fraudulent user when a length of time indicated by time information included in the first action information is less than a first threshold value and a length of time indicated by time information included in the second action information is less than a second threshold value. For example, the fraud detection module 105 may determine that the user is a fraudulent user when the number of screens indicated by the screen count information included in the first action information is less than a first threshold value and the number of screens indicated by the screen count information included in the second action information is less than a second threshold value. The same applies to the operation amount information and the screen type information.

According to Modification Example 8, fraud by the user is detected based on the first action information and the second action information. As a result, fraud such as changing or registering a plurality of pieces of user information one after another is detected, and the accuracy of fraud detection is further enhanced.

5-9. Modification Example 9

For example, the fraud detection system S may include the detection result provision module 111 which provides a detection result of fraud by the user obtained by the fraud detection module 105 to another service which the user has registered to use. The another service determines whether or not the user in the another service is a fraudulent user based on the detection result obtained by the fraud detection module 105. The another service may be any service, as long as the service is a service which works in cooperation with the SNS. For example, the another service may be an online shopping service provided by the same company as the operating company of the SNS.

For example, a server computer of the another service detects fraud by the user by comprehensively considering the detection result of fraud based on the users in the another service and the detection result of fraud by the user by the fraud detection module 105. For example, fraud may be detected by a score based on those two detection results, or fraud may be determined when any one or both of those two detection results are considered to indicate fraud. The method itself of detecting fraud in the another service may be a method corresponding to the another service. For example, in the case of an electronic payment service, a method of detecting fraudulent use of a credit card may be used. As another example, in the case of a financial service, a method of detecting fraudulent transfers may be used.

According to Modification Example 9, the accuracy of fraud detection in another service which the user has registered to use is enhanced by providing the detection result of fraud by the user obtained by the fraud detection module 105 to the another service.

The fraud detection module 105 may acquire the detection result of fraud in the another service, and detect fraud by the user in the SNS based also on that detection result of fraud. In this case, the detection result of fraud in the another service may be used as one of the feature amounts input to the learning model M. When the learning model M is not used, the detection result of fraud in the another service may be used as one of the determination items for detecting fraud by the user in the SNS.

5-10. Modification Example 10

For example, the service targeted for fraud detection is not limited to the example of the embodiment. The fraud detection system S can also be applied to services such as an electronic payment service, an electronic commerce service, an electronic ticket service, a financial service, or a communication service. In this modification example, there is described a case in which fraud by the user in an electronic payment service is detected.

In the electronic payment service, any electronic payment can be used. For example, payment means such as a cash card, a debit card, a bank transfer, points, electronic money, electronic cash, or some other electronic value can be used. The user information is information to be used in the electronic payment service. For example, the user information includes information relating to those payment means. For example, the user information includes information such as a card number of a cash card, a maximum usage amount, electronic money identification information, an electronic money maximum usage amount, or an electronic money maximum top-up amount. For example, the user information includes authentication information for using those payment means.

For example, a user who has logged in to the electronic payment service can use the payment method registered as the user information. The electronic payment itself using the payment means can use known processing. For example, credit card credit processing, bank account withdrawal processing, point allotment processing, electronic money payment processing is executed. A user who has logged in to the electronic payment service may be provided with usage status information relating to a usage status of the electronic payment service. The method itself of detecting fraud in the electronic payment service is the same as the fraud detection method in the SNS described in the embodiment. Fraud may be detected based on the action information until the user information such as the password in the electronic payment service is changed.

According to Modification Example 10, the accuracy of fraud detection in the electronic payment service is enhanced.

5-11. Other Modification Examples

For example, the modification examples described above may be combined.

For example, a case in which fraud is detected based on the actions performed until the user information screen G3 for changing or registering the second password is displayed has been described, but fraud may be detected based on the actions performed until the user information screen G3 for changing or registering other user information is displayed. For example, fraud may be detected based on the actions performed until the user information screen G3 for changing or registering the first password or other authentication information is displayed. For example, when the fraud detection system S is applied to an electronic payment service like in Modification Example 10, fraud may be detected based on the actions performed until the user information screen G3 for changing a personal identification number or maximum usage amount used in the electronic payment service, changing the maximum top-up amount for electronic money, changing the registered card, or registering a new remittance destination is displayed.

Further, for example, a case in which the main functions are implemented by the server 10 has been described, but each function may be shared by a plurality of computers. For example, the functions may be shared between the server 10 and the user terminal 20. For example, the functions may be shared by a plurality of server computers. For example, the data to be stored in the data storage unit 100 may be stored in a database server.

The invention claimed is:

1. A fraud detection system, comprising at least one processor configured to:
   detect a login of a user in a predetermined service;
   display a user information screen for changing or registering user information on a display for the user who has logged in to the predetermined service;

acquire action information relating to an action of the user in at least a part of a period from detection of the login to display of the user information screen; and detect fraud by the user based on the action information;
  wherein the action information includes screen type information relating to a type of a screen displayed in at least a part of the period from detection of the login to display of the user information screen,
  wherein there are a plurality of types of a screen;
  wherein the action information includes screen count information relating to a number of screens of certain types that are displayed in at least a part of the period from detection of the login to display of the user information screen, and
  wherein the at least one processor is configured to detect fraud by the user based on the screen count and screen type information.

2. The fraud detection system according to claim 1,
wherein the action information includes time information relating to a length of time of at least a part of the period from detection of the login to display of the user information screen, and
wherein the at least one processor is configured to detect fraud by the user based on the time information.

3. The fraud detection system according to claim 1,
wherein the action information includes operation amount information relating to an operation amount in at least a part of the period from detection of the login to display of the user information screen, and
wherein the at least one processor is configured to detect fraud by the user based on the operation amount information.

4. The fraud detection system according to claim 1,
wherein the at least one processor is configured to acquire history information relating to an action history of the user at a time of past login, and
wherein the at least one processor is configured to detect fraud by the user based on a difference between the action information and the history information.

5. The fraud detection system according to claim 1,
wherein the user information includes authentication information relating to authentication in the predetermined service, and
wherein the at least one processor is configured to detect fraud by the user based on the action information when the authentication information is changed or registered on the user information screen.

6. The fraud detection system according to claim 1,
wherein the user information includes usage condition information relating to a usage condition in the predetermined service, and
wherein the at least one processor is configured to detect fraud by the user based on the action information when the usage condition information is changed or registered on the user information screen.

7. The fraud detection system according to claim 1,
wherein the user information includes provision destination information relating to a provision destination of an item to be provided in the predetermined service, and
wherein the at least one processor is configured to detect fraud by the user based on the action information when the provision destination information is changed or registered on the user information screen.

8. The fraud detection system according to claim 1,
wherein the at least one processor is configured to restrict change or registration of the user information on the user information screen when fraud by the user is detected.

9. The fraud detection system according to claim 1, at least one processor is configured to forcibly log out the user logged in to the predetermined service when fraud by the user is detected.

10. The fraud detection system according to claim 1, wherein the at least one processor is configured to, when fraud by the user is detected, provision of the predetermined service based on the user information is changed or registered on the user information screen.

11. The fraud detection system according to claim 1, wherein the at least one processor is configured to, when fraud by the user is detected, before the predetermined service is provided based on the user information changed or registered on the user information screen, the user to perform authentication which is not requested when fraud by the user is not detected.

12. The fraud detection system according to claim 1,
wherein the at least one processor is configured to display, on the display, a determination criterion screen to be used as a determination criterion of fraud detection before the user information screen is displayed,
wherein the action information includes operation information relating to an operation of the user on the determination criterion screen, and
wherein the at least one processor is configured to detect fraud by the user based on the operation information.

13. The fraud detection system according to claim 1,
wherein the at least one processor is configured to display, on the display, a first user information screen for changing or registering first user information and a second user information screen for changing or registering second user information,
wherein the action information is acquired as first action information relating to an action of the user in at least a part of a period from detection of the login to display of the first user information screen and second action information relating to an action of the user in at least a part of a period from display of the first user information screen to display of the second user information screen, and
wherein the at least one processor is configured to detect fraud by the user based on the first action information and the second action information.

14. The fraud detection system according to claim 1, wherein the at least one processor is configured to provide a detection result of fraud by the user to another service which the user has registered to use.

15. The fraud detection system according to claim 1, wherein the at least one processor is configured to detect fraud by the user based on the action information and a learning model for detecting fraud in the predetermined service.

16. The fraud detection system according to claim 1,
wherein the predetermined service is an electronic payment service, and
wherein the user information is information to be used in the electronic payment service.

17. The fraud detection system according to claim 1, wherein the screen type information is at least one screen type selected from the group consisting of: a login screen, a home screen, a talk screen, a timeline screen, a news screen, a game screen and the user information screen.

18. A fraud detection method, comprising:
detecting a login of a user in a predetermined service;

displaying a user information screen for changing or registering user information on a display for the user who has logged in to the predetermined service;

acquiring action information relating to an action of the user in at least a part of a period from detection of the login to display of the user information screen; and detecting fraud by the user based on the action information;

wherein the action information includes screen type information relating to a type of a screen displayed in at least a part of the period from detection of the login to display of the user information screen, wherein there are a plurality of types of a screen;

wherein the action information includes screen count information relating to a number of screens of certain types that are displayed in at least a part of the period from detection of the login to display of the user information screen, and wherein the at least one processor is configured to detect fraud by the user based on the screen count and screen type information.

19. A non-transitory computer-readable information storage medium for storing a program for causing a computer to:

detect a login of a user in a predetermined service;

display a user information screen for changing or registering user information on a display for the user who has logged in to the predetermined service;

acquire action information relating to an action of the user in at least a part of a period from detection of the login to display of the user information screen; and detect fraud by the user based on the action information;

wherein the action information includes screen type information relating to a type of a screen displayed in at least a part of the period from detection of the login to display of the user information screen, wherein there are a plurality of types of a screen;

wherein the action information includes screen count information relating to a number of screens of certain types that are displayed in at least a part of the period from detection of the login to display of the user information screen, and wherein the at least one processor is configured to detect fraud by the user based on the screen count and screen type information.

* * * * *